(12) United States Patent
Frangioni et al.

(10) Patent No.: US 12,606,311 B2
(45) Date of Patent: Apr. 21, 2026

(54) MULTI-PASS SPIRAL MESH SCREEN ASSEMBLY

(71) Applicant: Hamilton Sundstrand Corporation, Charlotte, NC (US)

(72) Inventors: Liana Frangioni, Windsor Locks, CT (US); Patrick M. McCord, Norwich, CT (US); Donald E. Army, Enfield, CT (US); Alexander Bosworth, Simsbury, CT (US); Michael Doe, Jr., Southwick, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 408 days.

(21) Appl. No.: 17/714,663

(22) Filed: Apr. 6, 2022

(65) Prior Publication Data

US 2023/0322391 A1    Oct. 12, 2023

(51) Int. Cl.
B64D 13/06     (2006.01)
B01D 53/26     (2006.01)

(52) U.S. Cl.
CPC ........... B64D 13/06 (2013.01); B01D 53/265 (2013.01); *B64D 2013/0662* (2013.01)

(58) Field of Classification Search
CPC ............ B64D 13/06; B64D 2013/0662; B01D 53/265
See application file for complete search history.

(56) References Cited

U.S. PATENT DOCUMENTS

| | | | | |
|---|---|---|---|---|
| 3,339,349 | A | * | 9/1967 | Farnum ................. B64D 13/00 |
| | | | | 55/455 |
| 10,532,311 | B2 | | 1/2020 | Rheaume et al. |
| 2020/0179851 | A1 | * | 6/2020 | Palmer ................. B01D 53/265 |
| 2021/0394910 | A1 | | 12/2021 | Ciais et al. |

FOREIGN PATENT DOCUMENTS

| | | |
|---|---|---|
| CN | 111408193 A | 7/2020 |
| DE | D257675 | 3/1913 |
| DE | 2753276 A1 | 5/1979 |
| JP | 2014188409 A | 10/2014 |

OTHER PUBLICATIONS

Kubo et al. (JP2014188409A), English Translation, 2014, Whole Document (Year: 2014).*
European Search Report for European Application No. 23166534.0; Report Mail Date Jun. 21, 2023 (6 Pages).

* cited by examiner

*Primary Examiner* — Jerry-Daryl Fletcher
*Assistant Examiner* — Keith Stanley Myers
(74) *Attorney, Agent, or Firm* — CANTOR COLBURN LLP

(57) ABSTRACT

A water extractor for use in an environmental control system includes a housing having an inlet end and an outlet end. A fog harvester assembly is mounted within the housing at a location between the inlet end and the outlet end. The fog harvester assembly includes at least one fog harvester insert having a condensing material including plurality of wires arranged in a wire array. At least one of the plurality of wires has a spiral configuration.

17 Claims, 6 Drawing Sheets

MULTI-PASS SPIRAL MESH SCREEN ASSEMBLY

BACKGROUND

Embodiments of the present disclosure relate to environmental control systems for a vehicle, and more particularly, to a water collector suitable for use in an environmental control system of an aircraft.

A water collector or water extractor may be provided within an environmental control system to capture or remove free moisture from an airflow. The water collector may include a separation device that directs the moisture present within the airflow to outer walls of the separation device and direct the free moisture towards a drain port. Often times the water collector may be substantially bulky and consume large amounts of space.

BRIEF DESCRIPTION

According to an embodiment, a water extractor for use in an environmental control system includes a housing having an inlet end and an outlet end. A fog harvester assembly is mounted within the housing at a location between the inlet end and the outlet end. The fog harvester assembly includes at least one fog harvester insert having a condensing material including plurality of wires arranged in a wire array. At least one of the plurality of wires has a spiral configuration.

In addition to one or more of the features described above, or as an alternative, in further embodiments the housing includes a diffuser, the fog harvester assembly being arranged at a downstream end of the diffuser.

In addition to one or more of the features described above, or as an alternative, in further embodiments the fog harvester assembly includes a plurality of fog harvester inserts.

In addition to one or more of the features described above, or as an alternative, in further embodiments the plurality of fog harvester inserts are separated from one another along an axis of the housing such that a medium is configured to pass through the plurality of fog harvester inserts in series.

In addition to one or more of the features described above, or as an alternative, in further embodiments comprising at least one spacer arranged between adjacent fog harvester inserts of the plurality of fog harvester inserts.

In addition to one or more of the features described above, or as an alternative, in further embodiments the plurality of wires of the wire array are arranged in at least two rows.

In addition to one or more of the features described above, or as an alternative, in further embodiments the spiral configuration of adjacent wires is varied.

In addition to one or more of the features described above, or as an alternative, in further embodiments the condensing material of the at least one fog harvester insert is mounted to a frame. The plurality of wires have a vertical orientation relative to the frame.

In addition to one or more of the features described above, or as an alternative, in further embodiments the condensing material of the at least one fog harvester insert is mounted to a frame. A bottom of the frame has one or more holes formed therein.

In addition to one or more of the features described above, or as an alternative, in further embodiments comprising an end plate positioned in overlapping arrangement with the at least one fog harvester insert. The end plate has a bottom lip and a height of the bottom lip is extended relative to a height of the bottom of the frame.

In addition to one or more of the features described above, or as an alternative, in further embodiments the end plate further comprises a plurality of fasteners for attaching the fog harvester assembly to the housing.

In addition to one or more of the features described above, or as an alternative, in further embodiments comprising a seal positioned between the end plate and the at least one fog harvester insert.

In addition to one or more of the features described above, or as an alternative, in further embodiments the housing further comprises an internal flange and movement of the fog harvester assembly being restricted in a first direction by the internal flange.

According to an embodiment, an environmental control system of a vehicle includes a component and a water extractor arranged downstream from and in fluid communication with the component relative to a flow of medium. The water extractor includes a housing having an inlet end and an outlet end and a fog harvester assembly mounted within the housing at a location between the inlet end and the outlet end. The fog harvester assembly includes at least one fog harvester insert having a condensing material including plurality of wires arranged in a wire array and at least one of the plurality of wires has a spiral configuration.

In addition to one or more of the features described above, or as an alternative, in further embodiments the vehicle is an aircraft.

In addition to one or more of the features described above, or as an alternative, in further embodiments the component is a turbine.

In addition to one or more of the features described above, or as an alternative, in further embodiments the housing includes a diffuser and the fog harvester assembly is arranged at a downstream end of the diffuser.

In addition to one or more of the features described above, or as an alternative, in further embodiments comprising a swirling mechanism mounted within the housing, upstream from the diffuser.

In addition to one or more of the features described above, or as an alternative, in further embodiments the fog harvester assembly includes a plurality of fog harvester inserts arranged in series relative to the flow of medium.

In addition to one or more of the features described above, or as an alternative, in further embodiments the spiral configuration of adjacent wires is varied.

BRIEF DESCRIPTION OF THE DRAWINGS

The following descriptions should not be considered limiting in any way. With reference to the accompanying drawings, like elements are numbered alike:

FIG. 6A is a detailed front view of the fog harvester insert of FIG. 5 according to an embodiment;

FIG. 6B is a detailed perspective view of the fog harvester insert of FIG. 5 according to an embodiment.

DETAILED DESCRIPTION

A detailed description of one or more embodiments of the disclosed apparatus and method are presented herein by way of exemplification and not limitation with reference to the Figures.

Figure 1:
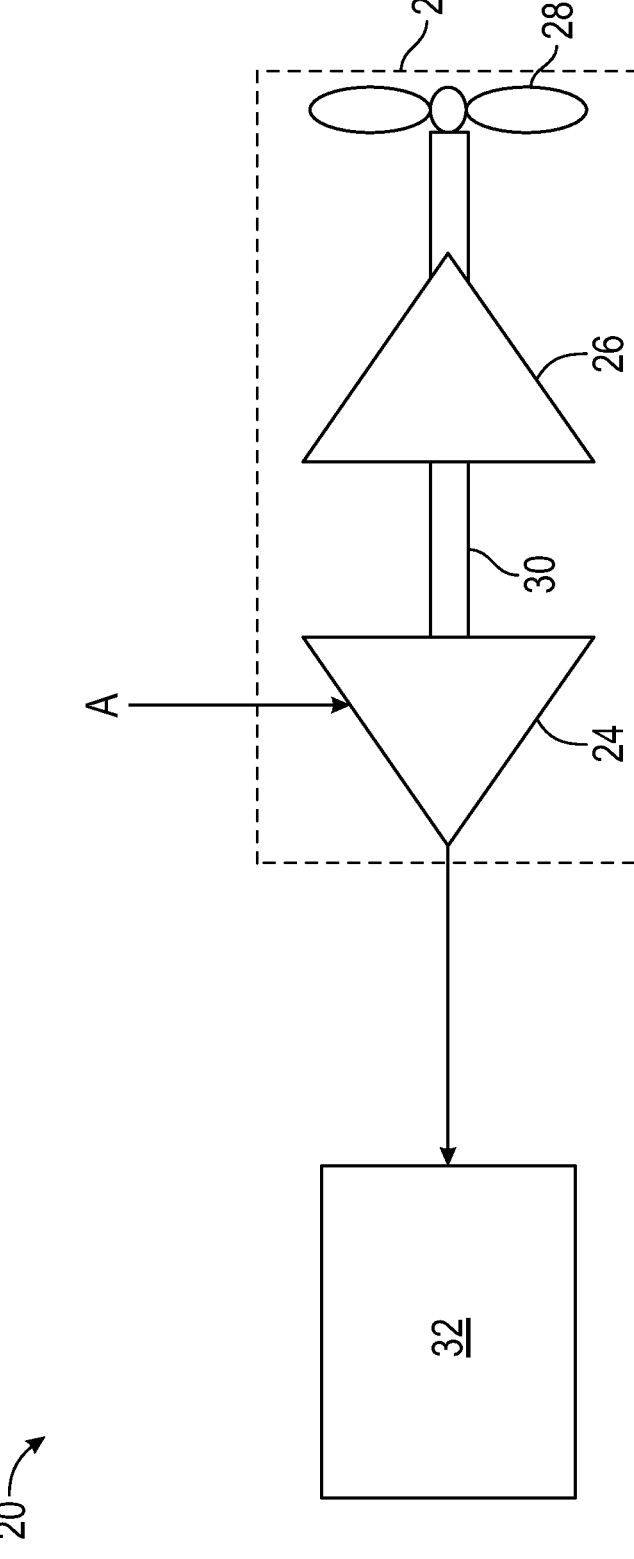
FIG. 1 is a schematic diagram of a portion of an environmental control system according to an embodiment.
Figure 2:
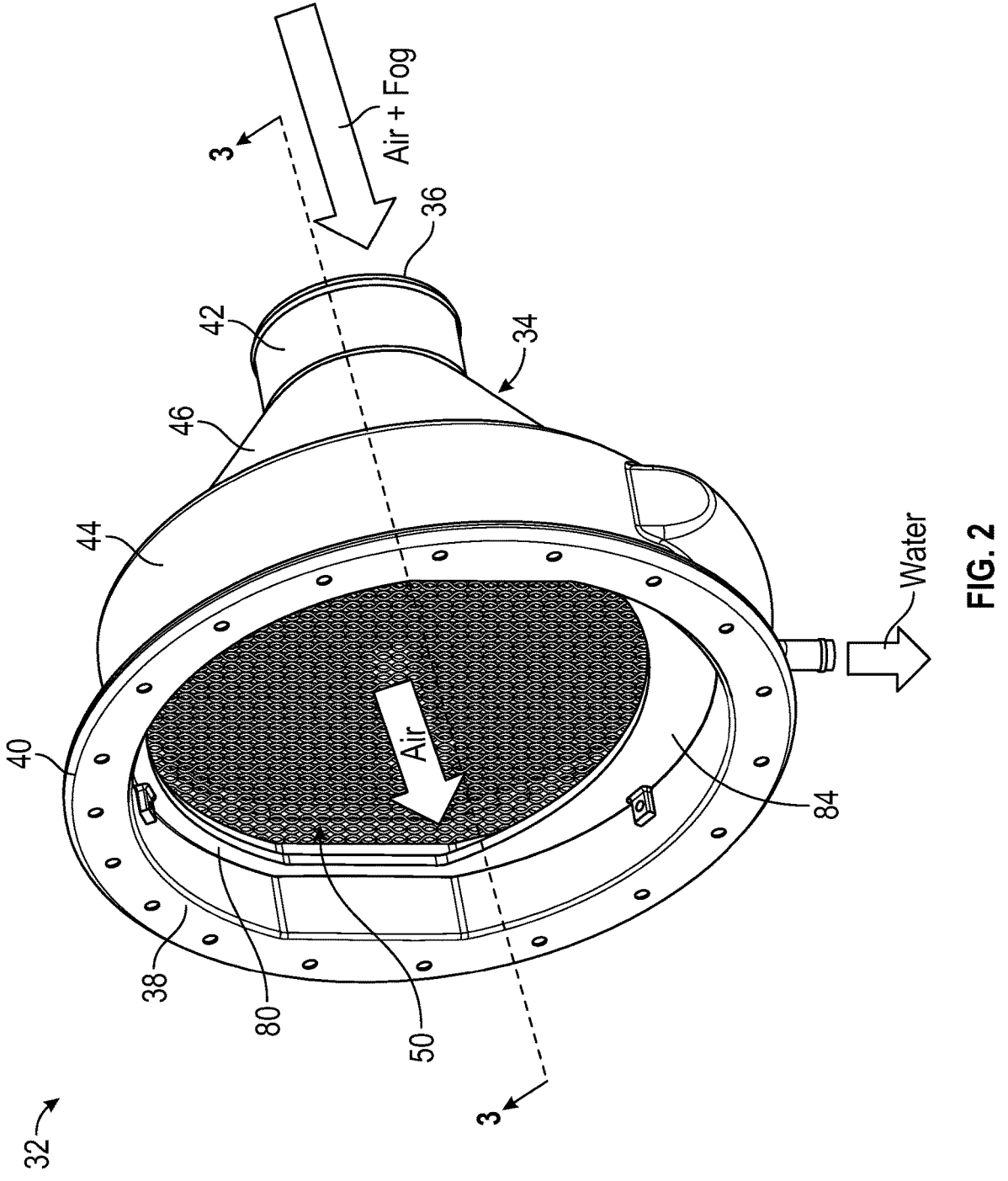
FIG. 2 is a perspective view of a water extractor of an environmental control system according to an embodiment.
Figure 3:
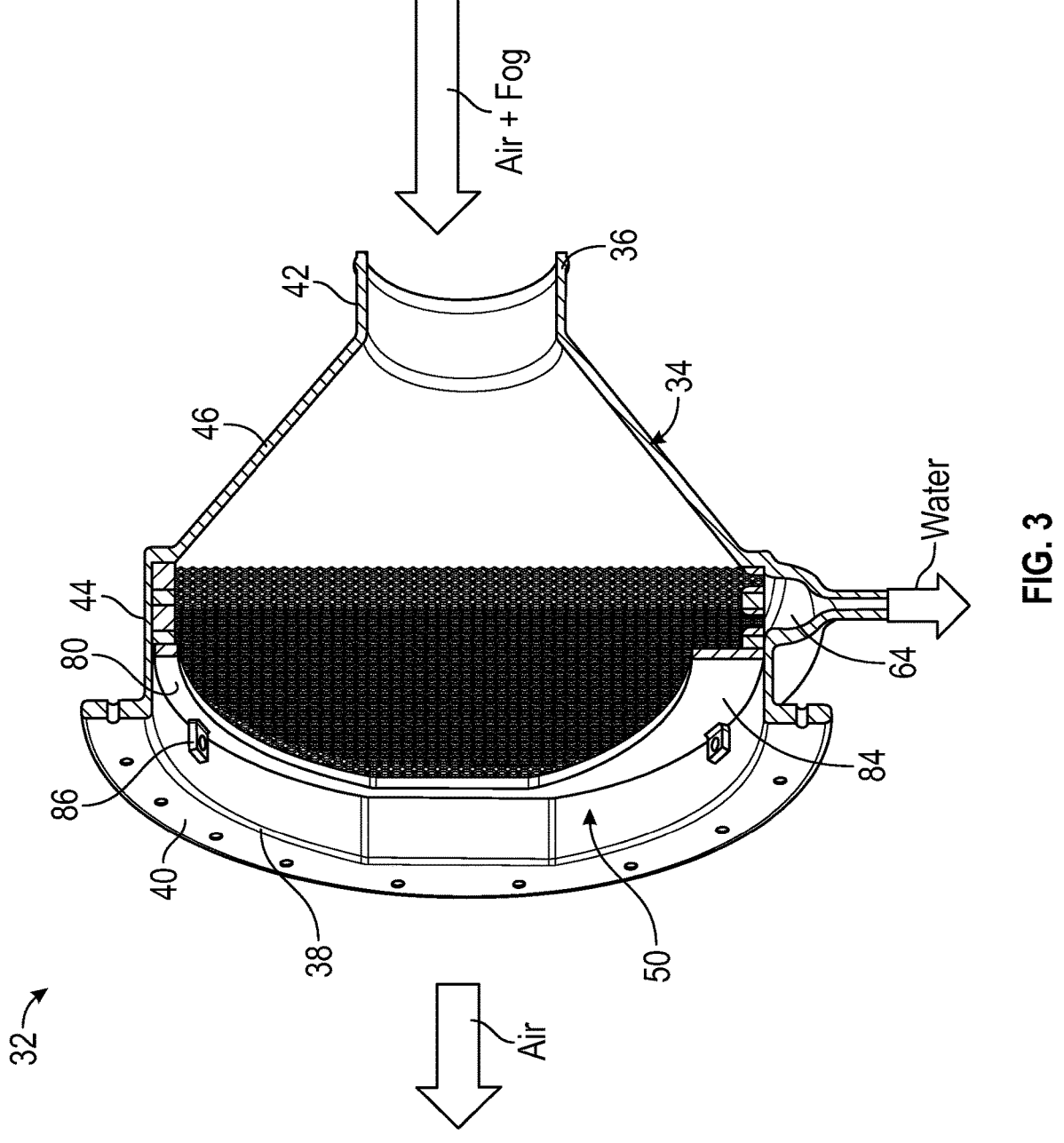
FIG. 3 is a cross-sectional view of the water extractor of FIG. 2 according to an embodiment.

With reference now to the FIG. 1, an exemplary portion of an environmental control system 20 is illustrated. As shown, the environmental control system (ECS) 20 includes an air cycle machine 22 having a turbine 24, and in some embodiments includes one or more other components, such as a compressor 26 and a fan 28 operably coupled to the turbine 24 by a rotatable shaft 30 for example. In the illustrated, non-limiting embodiment, the water extractor 32 is arranged downstream from the outlet of the turbine 24. However, it should be understood that embodiments where the water extractor 32 is arranged downstream from any suitable component of the ECS 20 are also contemplated herein. In an embodiment, the water extractor 32 is positioned within the ECS 20 to receive a flow of medium or air A that is cool and has condensed water vapor entrained or suspended therein resulting in a fog-like consistency.

With reference now to FIGS. 2-7, a non-limiting embodiment of a water extractor 32 is shown in more detail. The water extractor 32 includes a housing 34 having an inlet end 36 and an outlet end 38. As previously noted, the inlet end 36 may be configured to couple directly or indirectly to an outlet of a turbine. Similarly, the outlet end 38 may be configured to couple the housing 34 with a downstream component (not shown) of the ECS 20, such as a heat exchanger or a converging outlet header for example. In an embodiment, the outlet end 38 includes an outwardly extending flange 40 configured to facilitate a connection with the downstream component.

In the illustrated, non-limiting embodiment, the cross-sectional area of the housing 34 adjacent to or near the inlet end 36 is substantially smaller than the cross-sectional area of the housing at or adjacent to the outlet end 38. This change in the cross-sectional area is selected to cause a change in one or both of the pressure of the medium A and the speed of the medium A as is flows through the housing 34. Accordingly the configuration of the housing 34 may be selected in part to achieve a flow at the outlet end 38 or upstream from the outlet end 38 having a desirable speed associated with one or more downstream components of the ECS 20. However, embodiments where the cross-sectional area at the outlet end 38 is substantially equal to or only slightly larger than the cross-sectional area at the inlet end 36 are also within the scope of the disclosure.

As shown, the housing 34 may have a first portion 42 extending from the inlet end 36, and a second portion 44 extending from the outlet end 38, and a third portion 46 disposed between the first portion 42 and the second portion 44. In an embodiment, the first portion 42 of the housing 34 has a substantially constant cross-sectional shape and area. In the illustrated, non-limiting embodiment, the first portion 42 of the housing 34 is generally cylindrical; however, a first portion 42 having any suitable configuration is contemplated herein. Although not shown, a swirling mechanism may be arranged within the first portion 42 of the housing 34, such as at a location near the inlet end 36 for example. Such a swirling mechanism may be configured to impart a swirl or spin on the medium thereby enhancing the distribution of the medium A, and in particular the water within the medium A, across the entire area of the housing 34.

The cross-sectional area and/or the cross-sectional shape of the third portion 46 of the housing 34 may vary over the axial length thereof. As a result of the change in the cross-sectional area of the third portion 46 along the axis, the third portion 46 may form a diffuser reducing the velocity and increasing the static pressure of the medium A. In an embodiment, the third portion 46 of the housing 34 has a generally circular cross-section such that the third portion 46 is substantially frustoconical in shape.

Figure 4:
FIG. 4 is an exploded view of the water extractor of FIG. 2 according to an embodiment.
Figure 5:
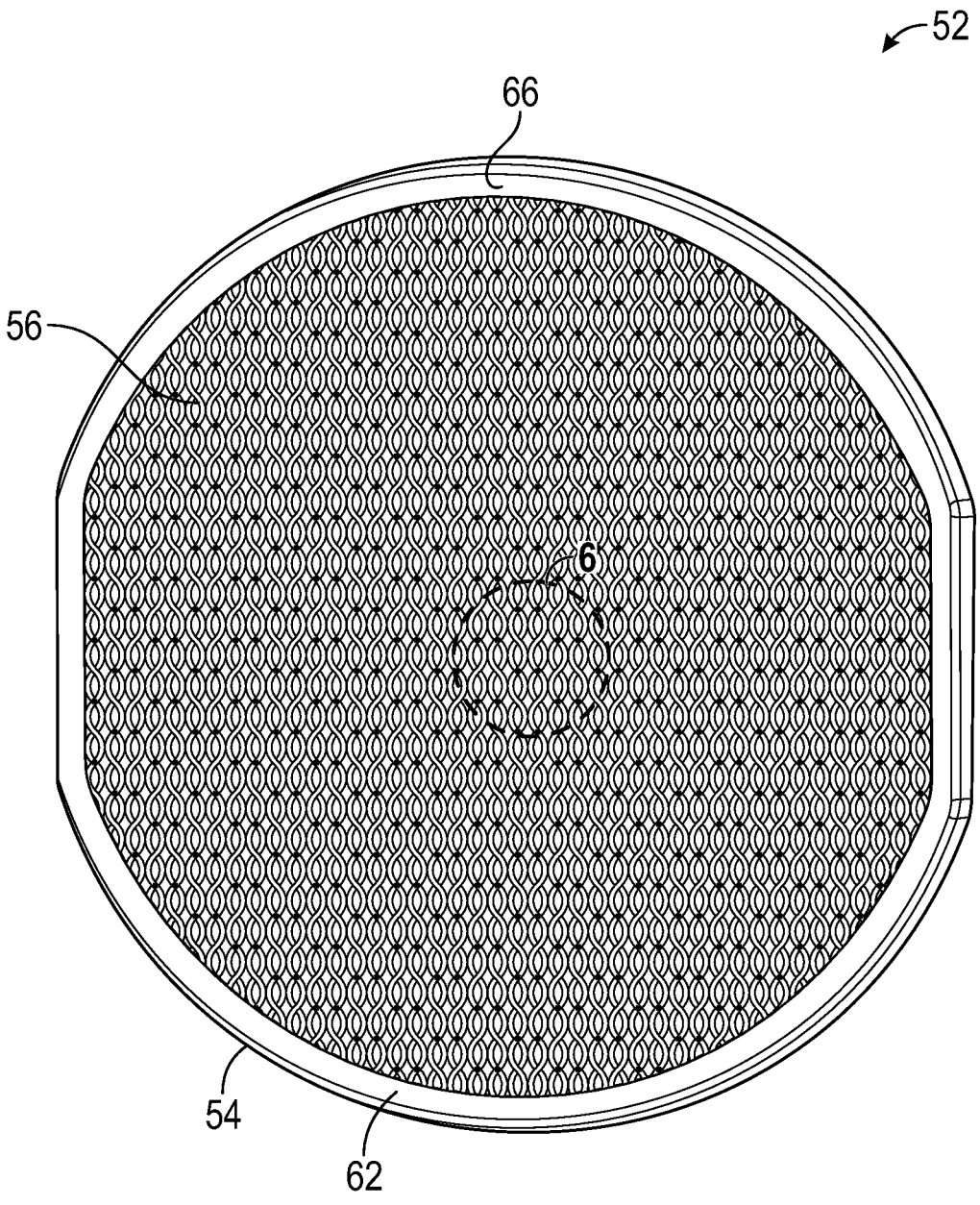
FIG. 5 is a front view of a fog harvester insert of a water extractor according to an embodiment.

The second portion 44 of the housing 34 may have a generally constant cross-sectional shape and area. Although the second portion 44 of the housing 34 is illustrated as being generally cylindrical in shape it should be understood that a second portion 44 having another suitable configuration is contemplated herein. As best shown in FIG. 4, in an embodiment, one or more sides of the circular wall that forms the second portion 44 may include one or more straight or linear sections 48. Although these straight sections are illustrated as being arranged at opposite lateral sides of the housing 34, embodiments where the at least one straight section is arranged elsewhere about the periphery of the second portion 44 are also contemplated herein.

Mounted within the housing 34, such as within the second portion 44 near the outlet end 38 (see FIGS. 2 and 3), is a fog harvester assembly 50 including at least one fog harvester insert 52. In the illustrated, non-limiting embodiment of FIGS. 2-5, the fog harvester assembly 50 includes two fog harvester inserts 52. However, it should be understood that a fog harvester assembly 50 having any number of fog harvester inserts 52, including a single fog harvester insert, three fog harvester inserts, or more than three fog harvester inserts for example, are within the scope of the disclosure. In embodiments including multiple fog harvester inserts 52, the plurality of fog harvester inserts 52 are stacked relative to one another along the axis of the housing 34, such that the medium is configured to flow through the plurality of fog harvester inserts 52 in series. Further, in embodiments including multiple fog harvester inserts 52, the configuration of each of the plurality of fog harvester inserts 52 may be substantially identical, or alternatively, may be different.

Each fog harvester insert 52 includes a frame 54 and a condensing material 56 installed about the frame 54. The frame 54 may be formed in any suitable manner including, but not limited to cast, injection molded, additively formed, and machined for example. The frame 54 is generally complementary to the corresponding portion of the housing 34 within which the fog harvester assembly 50 is received. In the illustrated, non-limiting embodiment, the frame 54 defines a periphery of the fog harvester insert 52 and is generally circular in shape. In embodiments where the second portion 44 of the housing 34 includes at least one straight section 48, the frame 54 may similarly include a straight section 58 positionable in alignment with the straight section 48 of the second portion 44 of the housing 34. Although the frame 54 is illustrated as only being arranged at a periphery of the fog harvester insert 52, embodiments where the frame 54 additionally includes at least one centrally located support extending between the sides of the frame 54 are also contemplated herein.

With continued reference to FIG. 4, in an embodiment, one or more holes or elongated slots 60 are formed at or adjacent to the bottom surface 62 of the frame 54 to fluidly couple the bottom of the frame 54 with a sump or drain 64 formed in an adjacent surface of the housing 34. In the illustrated, non-limiting embodiment, the at least one hole 60 includes a single slot extending about at least 20 degrees of the periphery, such as 30 degrees or more, or even 45 degrees or more. Although the slot 60 is shown as extending over only a portion of the width of the frame 54 (the slot is shown formed at a center of the frame 54), embodiments where the one or more holes 60 extend over a substantial entirety of the width of the frame 54 are also within the scope of the disclosure.

With continued reference to FIGS. 2-7, in the illustrated, non-limiting embodiment, the condensing material 56 includes a plurality of wires 72 arranged within an array, each wire has helical or spiral configuration. The wires 72 may be mounted relative to the frame 54 in a vertical orientation such that the wires 72 are parallel to one another and a first end of each wire 72 is coupled to a first end or top 66 of the frame 54 and a second end of each wire 72 is coupled to a second, opposite end or bottom 62 of the frame 54. However, embodiments where the wires 72 have another orientation are also contemplated herein.

The plurality of wires 72 within the array may be made of any suitable material. Examples of suitable materials include, but are not limited to steel, steel alloys, copper, aluminum, other metals or metal alloys, composites, nylon, polyester, rayon, or another suitable polymer or plastic material, or any combination thereof. As shown, the wire array associated with each fog harvester insert 52 includes a plurality of rows of wires or strings 72 arranged in series relative to the flow through the housing 34. Although two rows of wires 72 are shown (FIG. 6A-6C), it should be understood that a fog harvester insert 52 having any number of rows of strings, including three rows, four rows, five rows, or more than five rows for example, are contemplated herein.

Figure 6C:
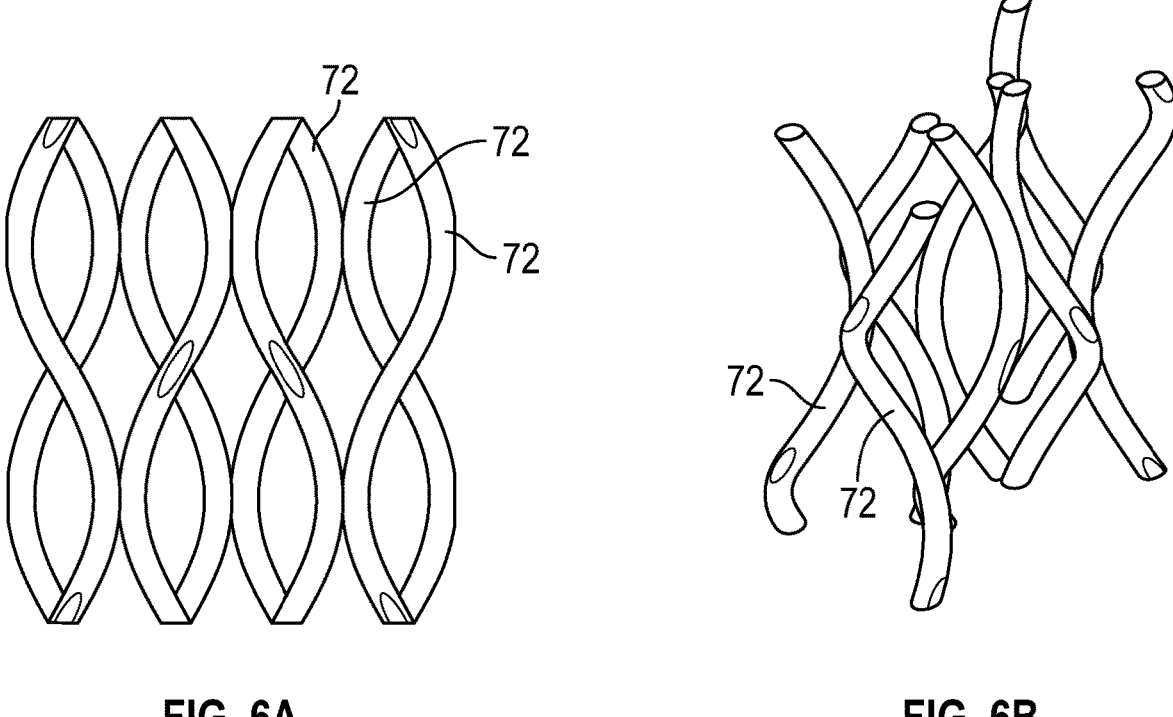
FIG. 6C is a detailed plan view of the fog harvester insert of FIG. 5 according to an embodiment.
Figure 6C:
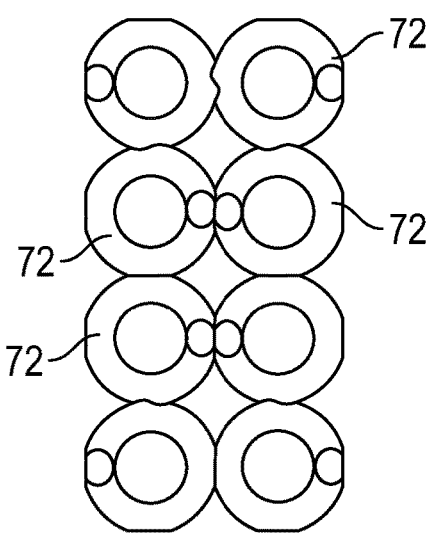

Each row within the array includes one or more wires. As best shown in FIG. 6C, the wires within each row may be positioned such that an outer periphery of the circular shape formed by the spiral of a first wire (in plan view) is directly adjacent to the circular shape formed by the spiral of a second wire (in plan view). Accordingly, the center of each spiral wire 72 is offset from the center of an adjacent spiral wire by a distance equal to an outer diameter of the circular shape of the spiral wires 72. Further, the spirals of adjacent wires within a row are not configured to overlap or intertwine with one another. Alternatively, or in addition, the spiral wires within adjacent rows, such as the first wires of the plurality of rows for example, may also be arranged so as not to overlap or intertwine. However, it should be understood that embodiments where adjacent spiral wires 72 within a row, or alternatively or additionally, spiral wires 72 within adjacent rows intertwine are also within the scope of the disclosure.

In addition, as best shown in FIG. 6A, the direction of the spiral of the wires 72, also referred to herein as the "spiral configuration", within a row is configured to vary. For example, a first wire has a left-hand or clockwise configuration and a second wire, for example positioned directly adjacent to the first wire, has a right-hand or counter clockwise configuration. Similarly, the first wire within adjacent rows may have alternating configurations.

In the illustrated, non-limiting embodiment of FIGS. 2-6C, the plurality of fog harvester inserts 52 within the fog harvester assembly 50 are separated from one another by a distance. As shown, at least one spacer 74, such as a frame for example, may be arranged between adjacent fog harvester inserts 52. In the illustrated, non-limiting embodiment, the spacer 74 is substantially identical to the frame 54 of a fog harvester insert 52. However, embodiments where a spacer 74 having a different configuration is used are also contemplated herein.

With continued reference to FIGS. 2-5, in an embodiment, the housing 34 is contoured or has an internal flange 76 (best shown in FIG. 3) arranged near the outlet end 38, for example near a downstream end of the third portion or diffuser 46 of the housing 34, and configured to support an internal end of the fog harvester assembly 50. The internal flange 76 restricts movement of the fog harvester assembly 50 in a first direction relative to the housing 34. The fog harvester assembly 50 may be sealed against the flange 76 such as via an O-ring type seal (not shown) for example.

An end plate 80 may be arranged in overlapping relationship with the most downstream fog harvester insert 52, located adjacent to the outlet end 38 of the housing 34. The end plate 80 has a substantially hollow center, similar to a frame 54 or spacer 74, to reduce interference with the flow output from the housing 34. In an embodiment, a seal 82, such as an O-ring type seal for example, is positioned between the fog harvester assembly 50 and the end plate 80.

A height (measured vertically) of a bottom lip 84 of the end plate 80 may be greater than the vertical height of the bottom 62 of the frames 54 and/or spacers 74 of the fog harvester inserts 52. As a result, the enlarged bottom lip 84 of the end plate 80 prevents any condensation collected near the bottom of the frame of the fog harvester inserts from becoming entrained in the airflow at the outlet end 38.

When installed, the condensing material 56 of the one or more fog harvester inserts 52 of the fog harvester assembly 50 extend generally vertically such that any moisture that collects on the wires 72 of the condensing material 56 will slide along the wires 60 towards the one or more holes 60 at the bottom 62 of the frame 54 in response to the gravity acting thereon. Although the fog harvester inserts 52 are generally described herein such that the condensing material 56 has a vertical orientation, embodiments where the condensing material 56 is arranged at a non-vertical angle relative to the longitudinal axis of the housing 34 are also within the scope of the disclosure.

A plurality of fasteners, illustrated at 86, may be used to couple the end plate 80 to a surface of the housing 34. Although a plurality of clips that use a threaded connection are illustrated in the FIGS., any suitable fastener is within the scope of the disclosure. When installed, movement of the fog harvester assembly 50 relative to the housing 34 is restricted by the internal flange 76 and the clips 86.

In operation, the medium A is provided to the inlet end 36 of the water extractor 32. As the medium A flows through the one or more fog harvester inserts 52 of the fog harvester assembly 50, water droplets collect on the surface of the wires 72 of the condensing material 56, or between adjacent layers of the condensing material 56, such as between two or more wires 72 for example. As a result, the medium A output from the water extractor 32 is dried or dehumidified compared to the inlet air. When the droplets reach a sufficient size or volume, the gravitational force acting thereon will cause the droplets to slide down the condensing material 56 to the bottom of the frame 54. At the bottom of the frame 54, the water passes through the one or more holes 60 and drips from the end of the fog harvester insert 52 into the drain 64 disposed vertically underneath the fog harvester assembly 50. From the drain 64, the water can be exhausted overboard, or alternatively, can be redirected to another component of the ECS 20, or alternatively, to another system or component of the aircraft.

Because the water extractor 32 illustrated and described herein is intended to coalesce and collect the moisture within the medium A, use of a water extractor 32 as described herein may minimize or even eliminate the need for a separate condenser located upstream from the water extractor 32 within the environmental control system.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A water extractor for use in an environmental control system, the water extractor comprising:
a housing having an inlet end and an outlet end; and
a fog harvester assembly mounted within the housing at a location between the inlet end and the outlet end, the fog harvester assembly including at least one fog harvester insert having a condensing material including plurality of wires arranged in a wire array, the wire array having a plurality of rows including a first row including a first portion of the plurality of wires and a second row including a second portion of the plurality of wires, wherein the plurality of wires have a spiral configuration, and the first portion of the plurality of wires is not in an overlapping arrangement with the second portion of the plurality of wires, and a direction of the spiral configuration of the first portion of the plurality of wires within the first row varies.

2. The water extractor of claim 1, wherein the housing includes a diffuser, the fog harvester assembly being arranged at a downstream end of the diffuser.

3. The water extractor of claim 1, wherein the fog harvester assembly includes a plurality of fog harvester inserts.

4. The water extractor of claim 3, wherein the plurality of fog harvester inserts are separated from one another along an axis of the housing such that a medium is configured to pass through the plurality of fog harvester inserts in series.

5. The water extractor of claim 1, further comprising at least one spacer arranged between adjacent fog harvester inserts of the plurality of fog harvester inserts.

6. The water extractor of claim 1, wherein the plurality of wires of the wire array are arranged in at least two rows.

7. The water extractor of claim 1, wherein the condensing material of the at least one fog harvester insert is mounted to a frame, the plurality of wires having a vertical orientation relative to the frame.

8. The water extractor of claim 1, wherein the condensing material of the at least one fog harvester insert is mounted to a frame, wherein a bottom of the frame has one or more holes formed therein.

9. The water extractor of claim 8, further comprising an end plate positioned in overlapping arrangement with the at least one fog harvester insert, the end plate having a bottom lip, wherein a height of the bottom lip is extended relative to a height of the bottom of the frame.

10. The water extractor of claim 9, wherein the end plate further comprises a plurality of fasteners for attaching the fog harvester assembly to the housing.

11. The water extractor of claim 9, further comprising a seal positioned between the end plate and the at least one fog harvester insert.

12. The water extractor of claim 1, wherein the housing further comprises an internal flange and movement of the fog harvester assembly being restricted in a first direction by the internal flange.

13. An environmental control system of a vehicle comprising:
a turbine;
a water extractor arranged in fluid communication with the turbine relative to a flow of medium, the water extractor comprising:
a housing having an inlet end and an outlet end, the inlet end being arranged directly downstream from and in fluid communication with an outlet of the turbine; and
a fog harvester assembly mounted within the housing at a location between the inlet end and the outlet end, the fog harvester assembly including at least one fog harvester insert having a condensing material including plurality of wires arranged in a wire array, wherein at least one of the plurality of wires has a spiral configuration, wherein a direction of the spiral configuration of the plurality of wires within a row of the wire array varies.

14. The environmental control system of claim 13, wherein the vehicle is an aircraft.

15. The environmental control system of claim 13, wherein the housing includes a diffuser, the fog harvester assembly being arranged at a downstream end of the diffuser.

16. The environmental control system of claim 13, wherein the fog harvester assembly includes a plurality of fog harvester inserts arranged in series relative to the flow of medium.

17. The environmental control system of claim 13, wherein the spiral configuration of adjacent wires is varied.

* * * * *